(12) United States Patent
Rogers

(10) Patent No.: US 10,563,661 B2
(45) Date of Patent: Feb. 18, 2020

(54) VERTICALLY SHAFTED AIR MOVING DEVICE

(71) Applicant: Louis Rogers, Brooklyn, NY (US)

(72) Inventor: Louis Rogers, Brooklyn, NY (US)

( * ) Notice: Subject to any disclaimer, the term of this patent is extended or adjusted under 35 U.S.C. 154(b) by 168 days.

(21) Appl. No.: 15/792,223

(22) Filed: Oct. 24, 2017

(65) Prior Publication Data

US 2019/0120239 A1    Apr. 25, 2019

(51) Int. Cl.
| F04D 25/10 | (2006.01) |
| F24F 7/007 | (2006.01) |
| F04D 27/00 | (2006.01) |
| F24F 11/00 | (2018.01) |
| F04D 25/06 | (2006.01) |

(52) U.S. Cl.
CPC ........... *F04D 25/105* (2013.01); *F04D 25/06* (2013.01); *F04D 27/004* (2013.01); *F24F 7/007* (2013.01); *F24F 11/0001* (2013.01); *F24F 2221/12* (2013.01)

(58) Field of Classification Search
CPC ........ F04D 25/105; F04D 25/06; F04D 25/10; F04D 27/004; F24F 7/007; F24F 11/0001; F24F 2221/12
See application file for complete search history.

(56) References Cited

U.S. PATENT DOCUMENTS

| RE16,656 | E | * | 6/1927 | Xippas | F04D 25/08 |
| | | | | | 415/198.1 |
| 2,121,177 | A | * | 6/1938 | Shipley | F04D 25/08 |
| | | | | | 415/8 |
| 4,768,926 | A | * | 9/1988 | Gilbert, Jr. | A61F 4/00 |
| | | | | | 415/118 |
| D315,198 | S | | 3/1991 | Chiang | |
| 5,013,224 | A | | 5/1991 | Liao | |
| 5,256,039 | A | | 10/1993 | Crawford | |
| D341,652 | S | | 11/1993 | Marino | |
| 5,720,594 | A | | 2/1998 | Snow | |
| 6,015,262 | A | * | 1/2000 | Huang | F04D 25/105 |
| | | | | | 403/344 |
| 6,533,551 | B2 | | 3/2003 | Escobar et al. | |
| 6,537,029 | B1 | | 3/2003 | Chen-Lung et al. | |
| 7,238,006 | B2 | * | 7/2007 | Studebaker | E04B 1/7092 |
| | | | | | 415/121.2 |
| 2009/0068010 | A1 | * | 3/2009 | Chang | F04D 25/08 |
| | | | | | 415/220 |
| 2014/0186197 | A1 | * | 7/2014 | Owusu | F04D 17/04 |
| | | | | | 417/326 |

FOREIGN PATENT DOCUMENTS

WO    WO-0218795 A1 *  3/2002  ............. F04D 25/10

* cited by examiner

*Primary Examiner* — Steven S Anderson, II

(57) ABSTRACT

A vertically shafted air moving device for circulating air includes a housing that defines an internal space. A shell is coupled to and extends from a top of the housing. The shell is meshed. The shell is configured to allow air to enter and exit the shell. A power module and a motor are coupled to the housing and are positioned in the internal space. The motor is operationally coupled to the power module. A shaft is coupled to and extends from the motor into the shell. Each of a plurality of blades is coupled to and extends from the shaft to proximate to an interior face of the shell. The motor is positioned to compel rotation of the shaft coincident with the blades. The blades are configured to circulate air in proximity to the shell.

9 Claims, 4 Drawing Sheets

VERTICALLY SHAFTED AIR MOVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to air moving devices and more particularly pertains to a new air moving device for circulating air.

BRIEF SUMMARY OF THE INVENTION

An embodiment of the disclosure meets the needs presented above by generally comprising a housing that defines an internal space. A shell is coupled to and extends from a top of the housing. The shell is meshed. The shell is configured to allow air to enter and exit the shell. A power module and a motor are coupled to the housing and are positioned in the internal space. The motor is operationally coupled to the power module. A shaft is coupled to and extends from the motor into the shell. Each of a plurality of blades is coupled to and extends from the shaft to proximate to an interior face of the shell. The motor is positioned to compel rotation of the shaft coincident with the blades. The blades are configured to circulate air in proximity to the shell.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
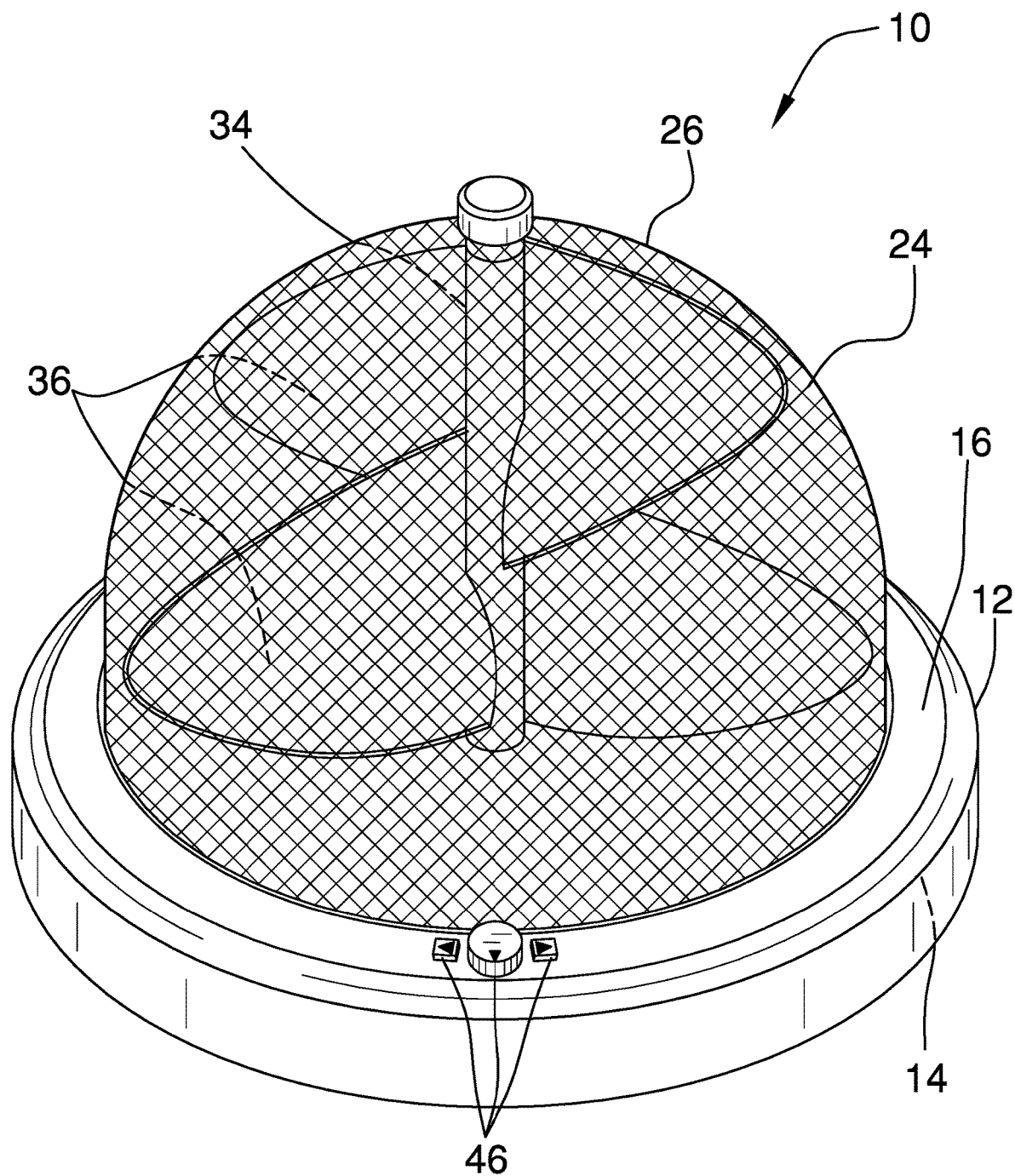
FIG. 1 is an isometric perspective view of a vertically shafted air moving device according to an embodiment of the disclosure.
Figure 2:
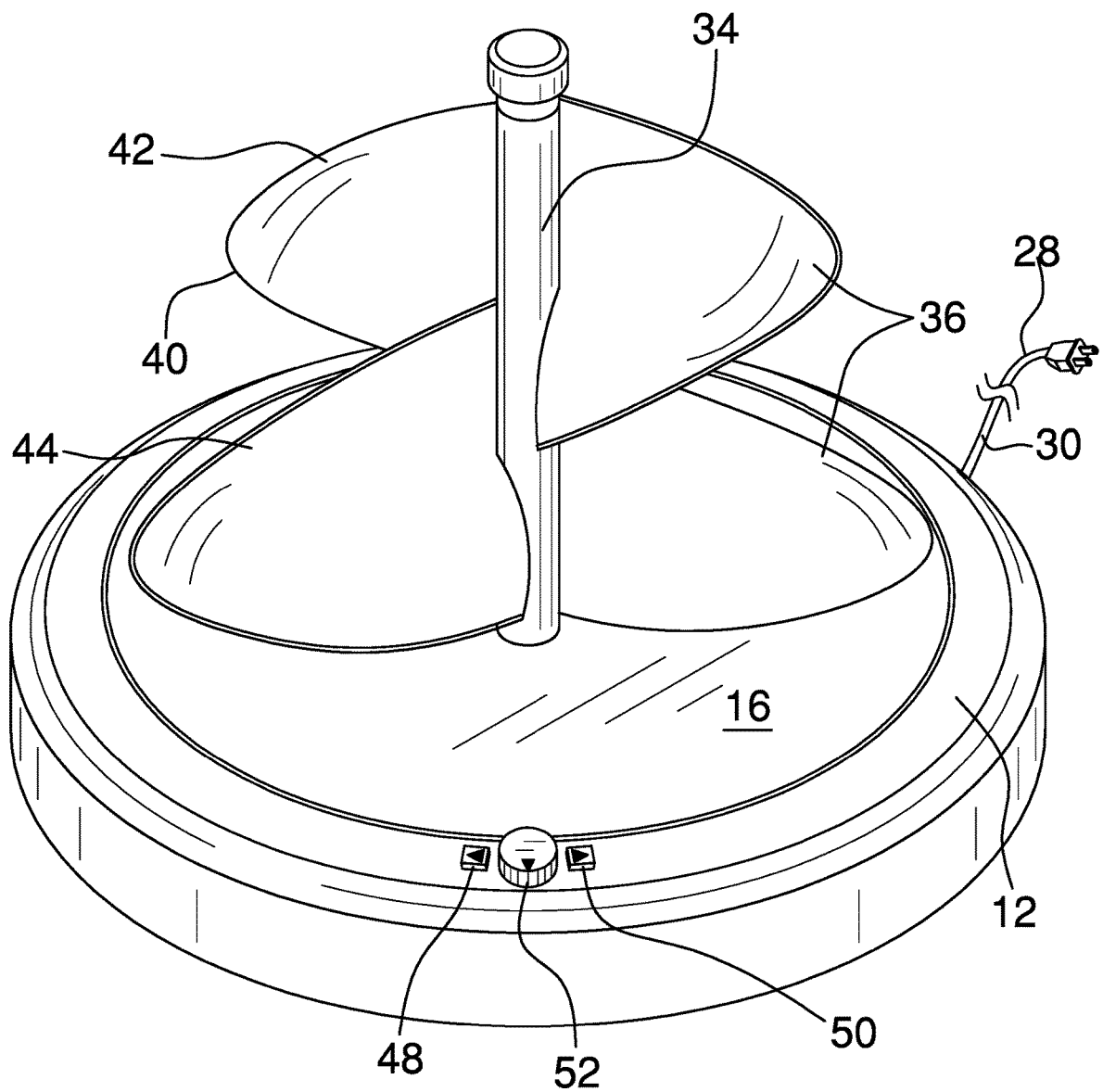
FIG. 2 is an isometric perspective view of an embodiment of the disclosure.
Figure 3:
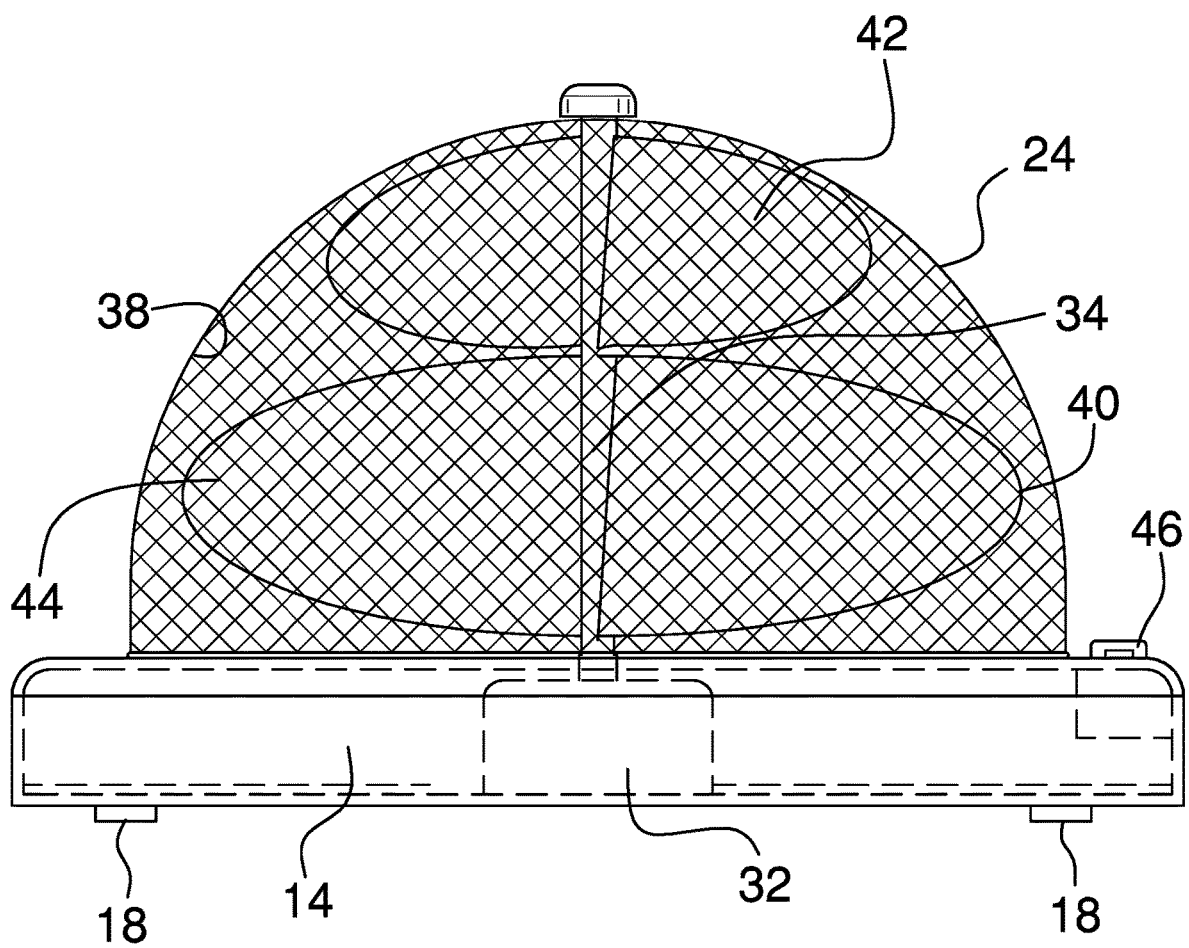
FIG. 3 is a side view of an embodiment of the disclosure.
Figure 4:
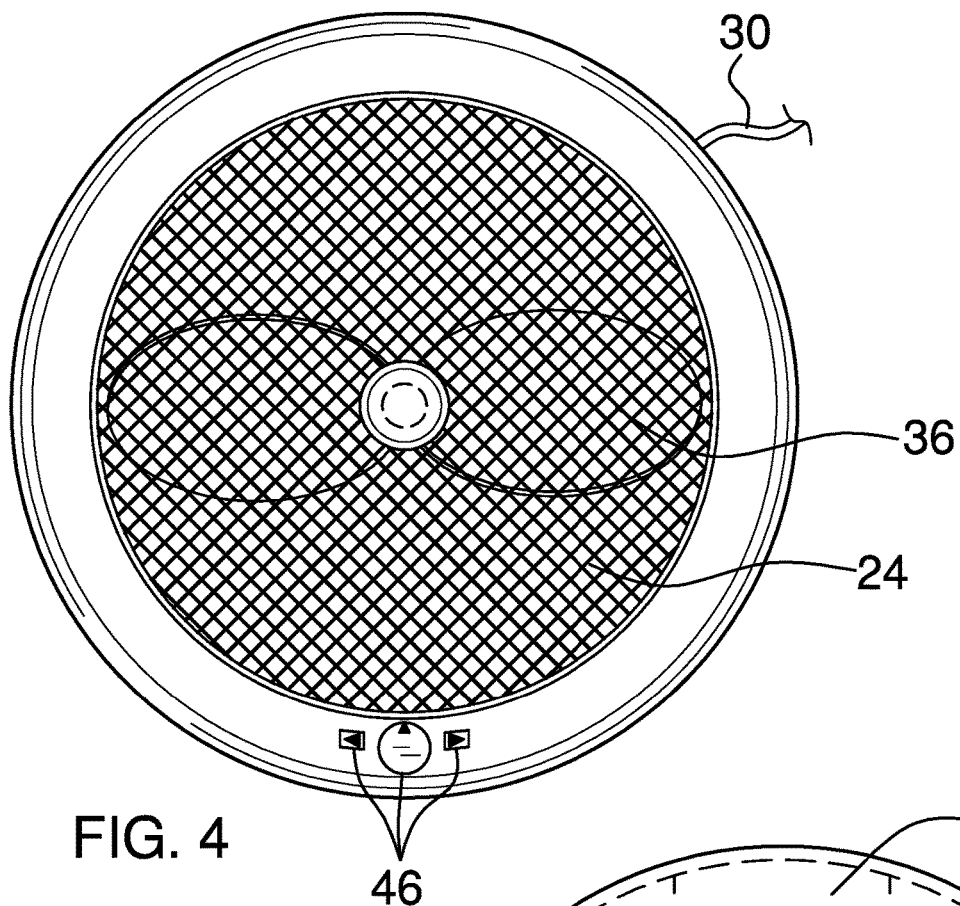
FIG. 4 is a top view of an embodiment of the disclosure.
Figure 5:
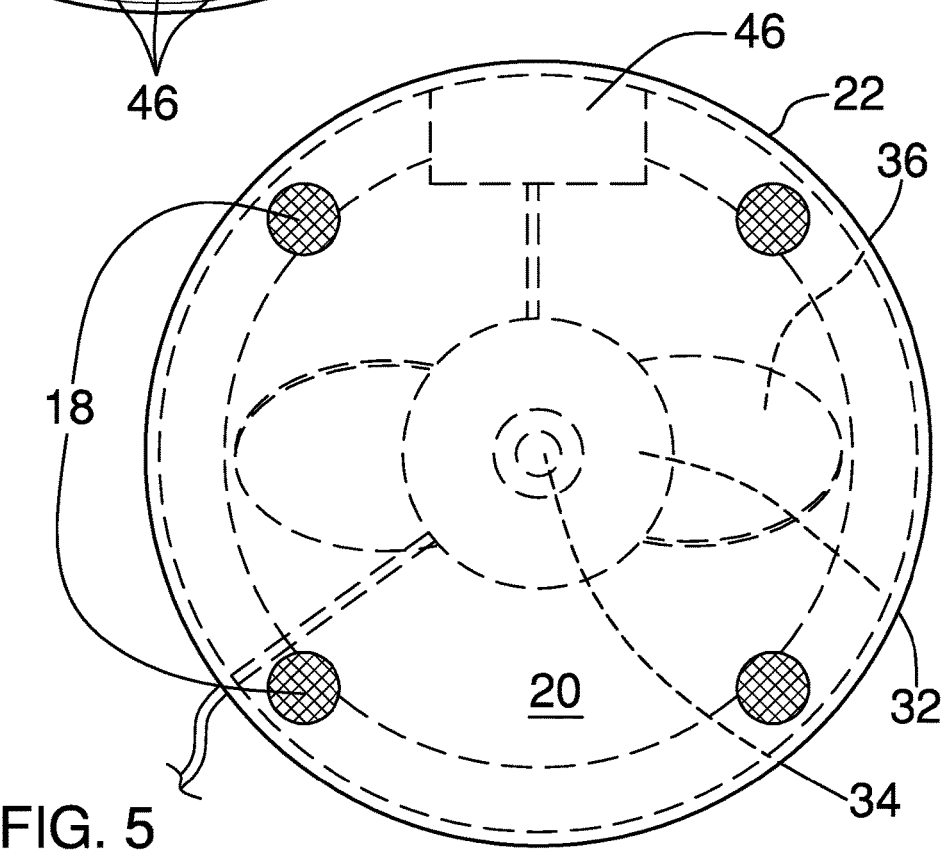
FIG. 5 is a bottom view of an embodiment of the disclosure.

With reference now to the drawings, and in particular to FIGS. 1 through 5 thereof, a new air moving device embodying the principles and concepts of an embodiment of the disclosure and generally designated by the reference numeral 10 will be described.

As best illustrated in FIGS. 1 through 5, the vertically shafted air moving device 10 generally comprises a housing 12 that defines an internal space 14. In one embodiment, the housing 12 is circularly shaped when viewed from a top 16 of the housing 12.

A plurality of feet 18 is coupled to and extends from a bottom 20 of the housing 12. The feet 18 are configured to stabilize the housing 12 on a substantially horizontal surface, such as a floor of a room. In one embodiment, the plurality of feet 18 comprises four feet 18 that are substantially equally distributed around a circumference 22 of the housing 12.

A shell 24 is coupled to and extends from the top 16 of the housing 12. The shell 24 is meshed. The shell 24 is configured to allow air to enter and exit the shell 24. In one embodiment, the shell 24 extends arcuately from the top 16 proximate to the circumference 22 of the housing 12 to define an upper surface 26 of the shell 24. The upper surface 26 is arcuate such that the shell 24 truncated ovally shaped.

A power module 28 is coupled to the housing 12 and is positioned in the internal space 14. In one embodiment, the power module 28 comprises a power cord 30 that is coupled to and extends from the housing 12. The power cord 30 is configured to couple to a source of alternating current.

A motor 32 is coupled to the housing 12 and is positioned in the internal space 14. The motor 32 is operationally coupled to the power module 28. A shaft 34 is coupled to and extends from the motor 32 into the shell 24. The motor 32 is positioned to compel rotation of the shaft 34. In one embodiment, the shaft 34 is rotationally coupled to the upper surface 26 of the shell 24.

Each of a plurality of blades 36 is coupled to and extends from the shaft 34 to proximate to an interior face 38 of the shell 24. The motor 32 is positioned to compel rotation of the shaft 34 coincident with the blades 36. The blades 36 are configured to circulate the air in proximity to the shell 24. In one embodiment, the blades 36 are arcuate such that the plurality of blades 36 is spirally configured relative to the shaft 34. Each blade 36 has an edge 40 that is positioned distal from the shaft 34. In another embodiment, the edge 40 is arcuate.

In yet another embodiment, the plurality of blades 36 comprises an upper blade 42 and a lower blade 44. The lower blade 44 is positioned proximate to the housing 12. The upper blade 42 is positioned between the lower blade 44 and the upper surface 26 of the shell 24. In still yet another embodiment, the upper blade 42 is dimensionally smaller than the lower blade 44, such that the upper blade 42 is complementary to the upper surface 26 of the shell 24.

A controller 46 is coupled to the housing 12. The controller 46 is operationally coupled to the motor 32 and the power module 28. The controller 46 is positioned to selectively couple the motor 32 to the power module 28. The motor 32 is positioned to compel rotation of the shaft 34 coincident with the blades 36. The blades 36 are configured to circulate the air in proximity to the shell 24. In one embodiment, the controller 46 comprises a first button 48, a second button 50, and a knob 52. The first button 48 and the second button 50 are depressible to select clockwise and counterclockwise rotation of the shaft 34, respectively. The knob 52 is rotatable relative to the housing 12. The knob 52 is positioned to control the rotational speed of the shaft 34.

The present invention also anticipates the controller 46 comprising a receiver. The receiver would receive wireless communication from a remote to control the direction of rotation of the shaft 34 and the rotational speed of the shaft 34.

In use, the first button 48 and the second button 50 are depressible to select clockwise and counterclockwise rotation of the shaft 34, respectively. The knob 52 is positioned to control the rotational speed of the shaft 34. The motor 32 is positioned to compel rotation of the shaft 34 coincident with the blades 36. The blades 36 are configured to circulate the air in proximity to the shell 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vertically shafted air moving device comprising:
   a housing defining an internal space;
   a shell coupled to and extending from a top of said housing, said shell being meshed such that said shell is configured for air entering and exiting said shell, said shell extending arcuately from said top proximate to a circumference of said housing defining an upper surface of said shell, said upper surface being arcuate such that said shell is truncated ovally shaped;
   a power module coupled to said housing and positioned in said internal space;
   a motor coupled to said housing and positioned in said internal space, said motor being operationally coupled to said power module;
   a shaft coupled to and extending from said motor into said shell, wherein said shaft is positioned on said motor such that said motor is positioned for compelling rotation of said shaft, said shaft being rotationally coupled to said upper surface of said shell, said shaft being vertically oriented extending perpendicularly from said housing into said shell;
   a plurality of blades, each said blade being coupled to and extending from said shaft to proximate to an interior face of said shell, said blades being arcuate such that said plurality of blades is spirally configured relative to said shaft, said plurality of blades comprising an upper blade and a lower blade, said lower blade being positioned proximate to said housing, said upper blade being positioned between said lower blade and said upper surface of said shell, said upper blade being dimensionally smaller than said lower blade such that said upper blade is complementary to said upper surface of said shell; and
   wherein said blades are positioned of said shaft such that said motor is positioned for compelling rotation of said shaft coincident with said blades, such that said blades are configured for circulating air in proximity to said shell.

2. The device of claim 1, further including said housing being circularly shaped when viewed from said top of said housing.

3. The device of claim 1, further including a plurality of feet coupled to and extending from a bottom of said housing, wherein said feet are positioned on said housing such that said feet are configured for stabilizing said housing on a substantially horizontal surface, such as a floor of a room.

4. The device of claim 3, further including said plurality of feet comprising four said feet substantially equally distributed around a circumference of said housing.

5. The device of claim 1, further including said power module comprising a power cord coupled to and extending from said housing, said power cord being configured for coupling to a source of alternating current.

6. The device of claim 1, further including each said blade having an edge positioned distal from said shaft, said edge being arcuate.

7. The device of claim 1, further including a controller coupled to said housing, said controller being operationally coupled to said motor and said power module, wherein said controller is positioned on said housing such that said controller is positioned for selectively coupling said motor to said power module, such that said motor is positioned for compelling rotation of said shaft coincident with said blades, such that said blades are configured for circulating air in proximity to said shell.

8. The device of claim 7, further including said controller comprising a first button, a second button, and a knob, said first button and said second button being depressible for selecting clockwise and counterclockwise rotation of said shaft, respectively, said knob being rotatable relative to said housing, said knob being positioned for controlling the rotational speed of said shaft.

9. A vertically shafted air moving device comprising:

a housing defining an internal space, said housing being circularly shaped when viewed from a top of said housing;

a plurality of feet coupled to and extending from a bottom of said housing, wherein said feet are positioned on said housing such that said feet are configured for stabilizing said housing on a substantially horizontal surface, such as a floor of a room, said plurality of feet comprising four said feet substantially equally distributed around a circumference of said housing;

a shell coupled to and extending from said top of said housing, said shell being meshed such that said shell is configured for air entering and exiting said shell, said shell extending arcuately from said top proximate to said circumference of said housing defining an upper surface of said shell, said upper surface being arcuate such that said shell is truncated ovally shaped;

a power module coupled to said housing and positioned in said internal space, said power module comprising a power cord coupled to and extending from said housing, said power cord being configured for coupling to a source of alternating current;

a motor coupled to said housing and positioned in said internal space, said motor being operationally coupled to said power module;

a shaft coupled to and extending from said motor into said shell, wherein said shaft is positioned on said motor such that said motor is positioned for compelling rotation of said shaft, said shaft being rotationally coupled to said upper surface of said shell, said shaft being vertically oriented extending perpendicularly from said housing into said shell;

a plurality of blades, each said blade being coupled to and extending from said shaft to proximate to an interior face of said shell, wherein said blades are positioned of said shaft such that said motor is positioned for compelling rotation of said shaft coincident with said blades, such that said blades are configured for circulating air in proximity to said shell, said blades being arcuate such that said plurality of blades is spirally configured relative to said shaft, each said blade having an edge positioned distal from said shaft, said edge being arcuate, said plurality of blades comprising an upper blade and a lower blade, said lower blade being positioned proximate to said housing, said upper blade being positioned between said lower blade and said upper surface of said shell, said upper blade being dimensionally smaller than said lower blade such that said upper blade is complementary to said upper surface of said shell;

a controller coupled to said housing, said controller being operationally coupled to said motor and said power module, wherein said controller is positioned on said housing such that said controller is positioned for selectively coupling said motor to said power module, such that said motor is positioned for compelling rotation of said shaft coincident with said blades, such that said blades are configured for circulating air in proximity to said shell, said controller comprising a first button, a second button, and a knob, said first button and said second button being depressible for selecting clockwise and counterclockwise rotation of said shaft, respectively, said knob being rotatable relative to said housing, said knob being positioned for controlling the rotational speed of said shaft; and wherein said first button and said second button are depressible for selecting clockwise and counterclockwise rotation of said shaft, respectively, wherein said knob is configured for controlling the rotational speed of said shaft, such that said blades are positioned of said shaft such that said motor is positioned for compelling rotation of said shaft coincident with said blades, such that said blades are configured for circulating air in proximity to said shell.

\* \* \* \* \*